A. F. PARKER.
CONCRETE TAMPER.
APPLICATION FILED JAN. 24, 1918.

1,329,796.

Patented Feb. 3, 1920.
2 SHEETS—SHEET 1.

WITNESSES
H. T. Walker
C. Bradway

INVENTOR
A. F. Parker
BY
ATTORNEYS

A. F. PARKER.
CONCRETE TAMPER.
APPLICATION FILED JAN. 24, 1918.
1,329,796.
Patented Feb. 3, 1920.
2 SHEETS—SHEET 2.
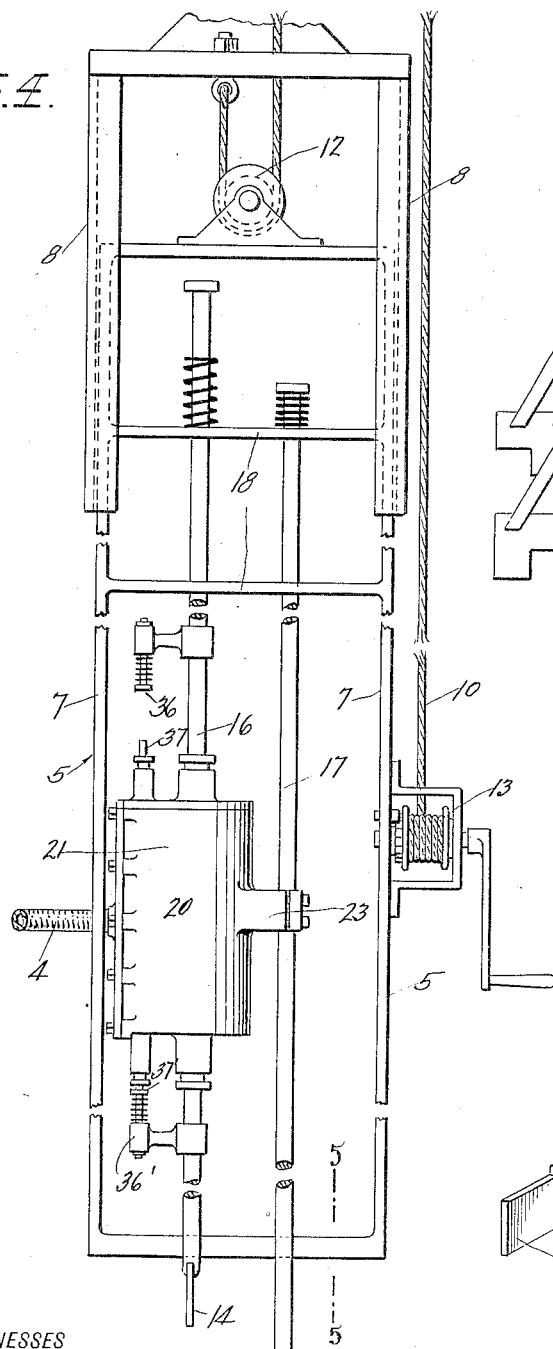
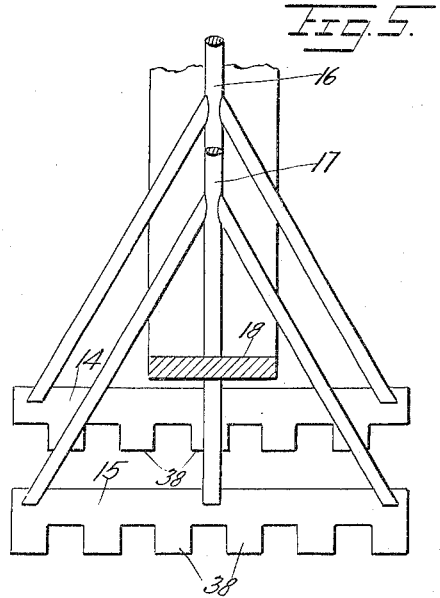
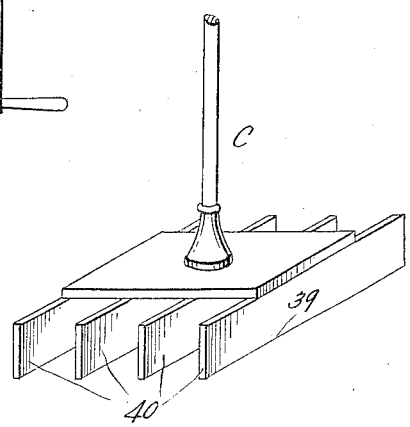
WITNESSES
H. T. Walker
C. Bradway
INVENTOR
A. F. Parker
BY Munn & Co
ATTORNEYS

UNITED STATES PATENT OFFICE.

ADELBERT FRANKLIN PARKER, OF OGDEN, UTAH.

CONCRETE-TAMPER.

1,329,796. Specification of Letters Patent. Patented Feb. 3, 1920.

Application filed January 24, 1918. Serial No. 213,505.

*To all whom it may concern:*

Be it known that I, ADELBERT F. PARKER, a citizen of the United States, and a resident of Ogden, in the county of Weber and State of Utah, have invented a new and Improved Concrete-Tamper, of which the following is a full, clear, and exact description.

This invention relates to the method of and means for tamping concrete for road and other constructions.

The present practice of building concrete roads is to use concrete of a rather soft and wet consistency; so wet in fact that it is not practicable to tamp or consolidate it more than to work it into place by means of shovels or hoes and bring it to grade, where it is left to settle and set. To produce the best wearing surface possible it is the custom to use a large amount of cement and then finish the surface as "one-course work" or, to use a comparatively thin top layer mixed much richer in cement than the main layer and called "two-course work". Both of these methods fail to give the best results because of the excessive amounts of water used in mixing the concrete, as is demanded by present field methods. Various expedients are used to overcome the defects caused by the excessive amounts of water used, such as rolling with rather light weight rollers, belt finishing, etc. But all present methods leave much to be desired in strength of concrete and wearing qualities of the surface.

It is well known that the greatest strength in concrete can only be attained by the use of but a small amount of water, much less than is demanded by present field methods, and then firmly compacting the resulting dry, coarse and harsh looking mixture by thorough tamping. This invention is directed toward the providing of a method of tamping and compacting concrete of the proper dry consistency, thus producing concrete of the greatest strength possible to attain with the materials used in making the concrete, and at the same time making a wearing surface by the "one-course" method that is superior to surfaces produced by the wet concrete. Through observation, study and practical experience, I am convinced that nothing will produce the desired best quality of concrete, strong, dense and with a wearing surface that will not peel, ravel or crack, unless the concrete is mixed dry, coarse and harsh in appearance and then thoroughly tamped and compacted into place, the process bringing the water and fine stuff to the surface for finishing. Practical trial of this method shows that when the proper amount of water is used and the tamping properly done, that, notwithstanding the roughness and harsh working qualities of the concrete, the mass is of great density and strength, the mortar is forced from between the coarser particles of the aggregate making a smooth, well-filled surface against the forms, which may be at once removed if desired, and that there is brought to the surface for finishing a sufficiency of the very best quality of mortar, plastic and with more cement than would be expected from the quantity used in the concrete. The surface thus produced has the appearance of being much richer in cement than when more water is used, and being plastic rather than soft and sloppy, can be finished immediately; it is evident that conditions described must produce a good surface, in fact, the very best possible.

The ordinary flat tampers do not work well; they, being applied to comparatively large areas, compact the whole area under them and form a top layer or crust that bridges over and prevents action to any extent on the lower parts of the concrete being tamped and do not force the mortar from between the coarser particles of the aggregate and to the top. There are several forms of tamper used, which are designed to overcome the defects of the flat tampers, by providing bars or projections to force down the coarser parts and bring the mortar to the top, but so far as my knowledge extends, all such fail to produce the best results because of the bars or projections being spaced too close together, the result being that full action to the bottom of the concrete being tamped is not realized, but the action is confined to the layer near the top, and while this brings some mortar to the top for finishing, it is not as much as should be so provided.

This invention is intended to overcome the defects mentioned as inherent in other forms of tampers by providing edges, blades, bars or projections placed at such distance apart as will allow the lines of force of the edges, blades, bars or projections of the tamper to act on the concrete in such a manner that substantially prismatic masses of the concrete having their base edges meeting will be subjected to compression. During the tamping action the blades are moved laterally step by step so that the entire layer will be subjected to the action of the blades. It is evident that the variations in the thickness of the layer of concrete to be tamped, assuming the concrete always to be of the same character, will require different tools with different distances between the blades, so that the prismatic masses acted on at each stroke will meet at the bases of the layer.

The form of tamper here described allows the use of much coarser aggregate than is customary to use, for all such large pieces are forced well down below the surface and it is a decided advantage and economy to use as large pieces as possible, inasmuch as their presence leaves less space to be filled with mortar. With any given amount of cement to the unit of concrete a reduction of the voids or spaces between the particles of the aggregate, means a reduction of the amount of mortar; this results in the given amount of cement making a greater proportion of the mortar and so provides a richer concrete. This makes for economy in the use of cement and so a reduction of cost.

The use of this tamper forces the mortar out from between the coarser and larger particles of the concrete, which action of forcing out is made more positive and easy by the loose uncompacted concrete just outside the lines of compression which allows the exit of the mortar from between the larger particles; by repeating the blows of the tamper, moving ahead the width of the active striking edges at each blow, results in a continuance of the compacting and forcing out process, until a maximum amount of mortar is forced to the top. This action is equivalent to a more thorough and intimate mixing of the mortar so forced out and upward, and inasmuch as there is no excess of water the mortar for finishing is in a nicely plastic condition, susceptible of being at once finished and favorable for making it of the greatest strength and wearing quality of the best.

Ordinary tampers are often as much as eight inches square on the active striking part; such a tamper has thus an active striking face of sixty-four square inches, which prevents very deep action as a result of each blow given with such a tamper. In contrast to this the present tamper would consist of four active striking edges each eight inches long and one-fourth of an inch wide, which gives an effective active striking face of eight square inches, and this active striking face has its parts so separated one from another as to distribute the force of each blow and permit the action and results of each blow to penetrate to the bottom of the layer of concrete being tamped and in compacting the larger particles, forcing the finer mortar from between the larger parts and upward to the surface; none of which action occurs from the blows of the ordinary tamper. The basic idea of the tamper here described is the wide separation of the active striking faces permitting a deeper penetration of the effects of the blows.

The invention is adaptable for either hand or power use, as will be explained hereinafter.

In the accompanying drawings, which illustrate certain embodiments of the invention and wherein similar characters of reference indicate corresponding parts in all the views, Figure 1 is a side view of the complete apparatus for tamping concrete by power, as in road construction work;

Fig. 4 is an enlarged side view of the tampers, actuating motor, carrying frame for the motor, and the guides in which the frame is mounted;

Fig. 5 is a sectional view showing the power-actuated tampers in side view;

Fig. 6 is a perspective view of a hand-operated tamper; and

Figure 1:
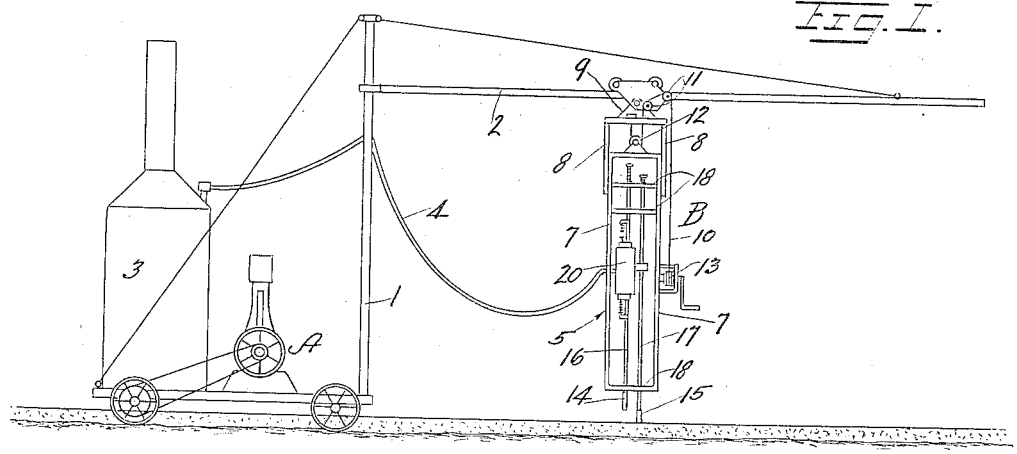
Figure 2:
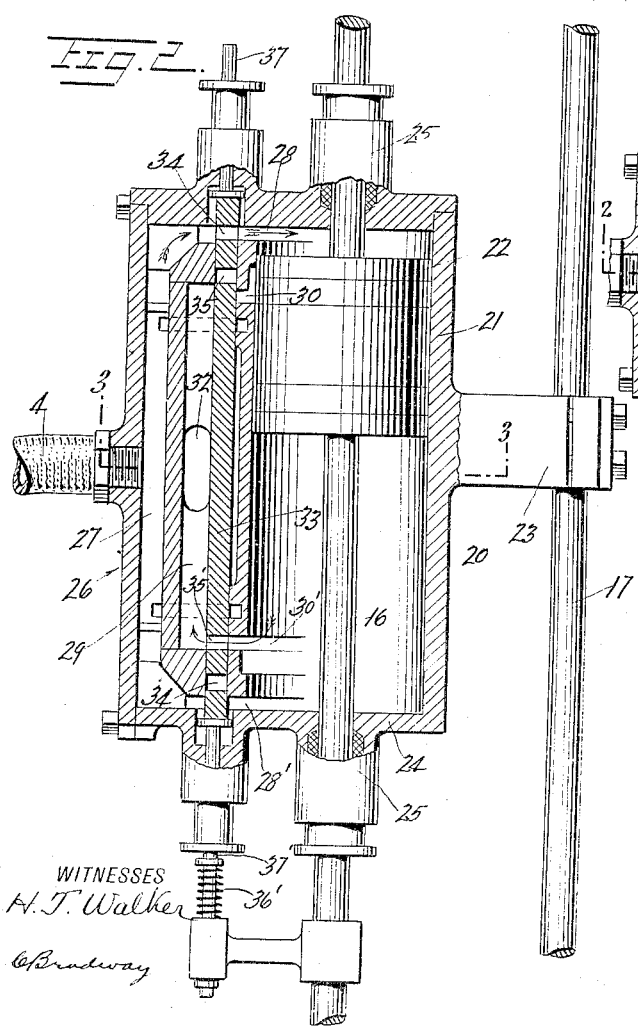
Fig. 2 is an enlarged vertical section of the motor for operating tampers, the section being taken on the line 2—2, Fig. 3.
Figure 3:
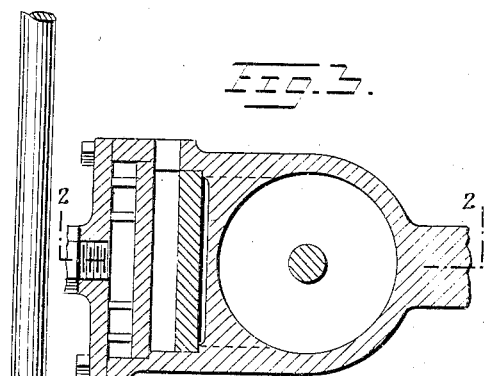
Fig. 3 is a horizontal section on the line 3—3, Fig. 2.

Referring to the drawing, A designates a self-propelled vehicle which carries a standard 1 on which is mounted a boom 2 that movably supports the tamping machine B, the machine being thus carried by and movable with the vehicle A. The machine embodies a fluid-actuated motor which is supplied from the boiler 3 on the vehicle A through a hose 4.

The tamping machine B comprises a vertically disposed rectangular frame 5 having its side members 7 movable in vertical guides 8 depending from the carriage 9, which moves back and forth on the boom 2. The frame 5 is moved up and down by means of a cable 10 which passes over pulleys 11 on the carriage 9, and a pulley 12 at the top of the frame 5, said cable being wound on a crank-operated drum 13 carried by the side of the frame 5.

In the present instance the machine B embodies a pair of tamping elements 14 and 15 arranged respectively at the lower ends of vertical rods 16 and 17, these rods being guided in a horizontal cross bar 18 of the frame 5. The tamping rods are simultaneously reciprocated in opposite directions by means of a steam-actuated motor 20 that receives its supply through the flexible pipe 4. The motor 20 is of the double-acting type and comprises a cylinder 21 and a piston 22, the cylinder being rigidly fastened at 23 with the rod 17, and the piston being rigidly fastened to the rod 16 which passes longitudinally through the cylinder heads 24 which are provided with stuffing-boxes 25 through which the rod 16 passes. Both the piston and cylinder reciprocate simultaneously in opposite directions so that when the rod 16 moves upwardly the rod 17 moves downwardly, and vice versa. The cylinder has a steam chest 26 to the inlet chamber 27 of which the hose 4 is connected, and this chamber 27 is connected with opposite ends of the cylinder through ports 28 and 28'. An exhaust chamber 29 is also arranged in the steam chest and is connected by ports 30 and 30' with the opposite ends of the cylinder, there being an outlet at 32 for the exhaust chamber 29. A plate-like slide valve 33 is arranged in the valve chest 26 and has admission ports 34 and 34' and exhaust ports 35 and 35', the said ports of the valves being so arranged that live steam is admitted at one end while exhaust steam is allowed to escape at the other end of the cylinder. The exhaust ports furthermore are so arranged that the escape of steam will be cut off at such time in the stroke of the piston that the entrapped steam will act as a cushion for the piston and cylinder. The valve is actuated by means of cushioned tappets 36 and 36' arranged on the rod 16 at points above and below the motor, and projecting out of the ends of the motor are stems 37 and 37' arranged to engage respectively the tappets 36 and 36' when the cylinder reaches the end of its stroke in one direction or the other. Thus, when the motor moves upwardly, the valve stem 37 will engage the tappet 36, and consequently the valve 33 of the motor is shifted so that steam will be admitted to the lower end of the cylinder so as to move the latter downwardly and the piston upwardly, and when the valve stem 37' engages the tappet 36' the valve will be shifted, so that steam will be admitted at the top of the cylinder to move the latter upwardly and the piston downwardly. In this manner the tampers are reciprocated.

Figure 7:
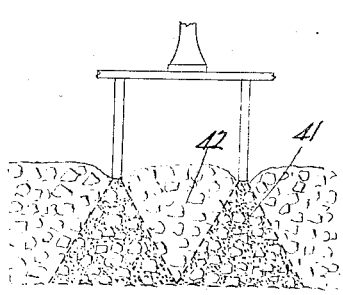
Fig. 7 is a diagrammatic view showing the manner in which each tamping blade or element acts on a prismatic mass of concrete in layer form.

The tamping elements 14 and 15 are in the form of narrow bars having serrated lower edges or faces 38 but it is to be understood that these edges may be of any desired form. In fact, they may be straight, as shown at 39, Fig. 6, and furthermore there may be any convenient number of tampers operative at the same time. In the hand form of tamping device C, Fig. 6, the edges 39 of the four tamping blades or elements 40 are arranged in a common plane, and the elements are spaced apart a certain distance determined by the depth of the layer of concrete to be tamped. This is also true with respect to the distance between the tamping elements 14 and 15, Figs. 4 and 5. As shown in Fig. 7, the compression and packing forces exerted by the bottom edge of each blade act on a prismatic mass of concrete 41, leaving oppositely disposed prismatic masses 42 which are not subjected to compression, and as a result of this the coarser particles work downwardly, whereas the plastic material of the concrete works to the top and leaves an excellent wearing surface, as has been pointed out. The tamping elements move gradually laterally with each successive stroke, so that the entire mass of concrete is effectively tamped. In the case of the machine B the attendant moves the whole frame gradually inwardly or outwardly on the boom while the tamping elements are operated on the concrete. The boom is capable of swinging on the standard 1 so that a wide area of concrete can be tamped without changing the position of the vehicle A.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. A dry concrete tamper having a long thin blade whose striking edge is provided with rectangular notches.

2. A concrete tamper including a plurality of vertically disposed, long, narrow, blades having substantially parallel bottom edges to engage the concrete, said bottom edges being serrated.

3. A concrete tamper including a plurality of vertically disposed, long, narrow, blades having substantially parallel bottom edges to engage the concrete, and means for reciprocating the blades alternately in opposite directions.

4. A tamping machine of the class described including a plurality of tamping blades having serrated edge engagement with the concrete, and a motor common to both blades for oppositely reciprocating the same simultaneously, the distance between the blades being many times the thickness of a blade.

5. A concrete tamper comprising a plurality of tamping elements, and a motor including a movable piston and a movable cylinder connected with the respective tamping elements for reciprocating the same.

6. A concrete tamper comprising a plurality of tamping elements, a motor including a movable piston and a movable cylinder connected with the respective tamping elements for reciprocating the same, a vertically movable frame supporting the motor, and a laterally movable carriage supporting the frame.

7. A concrete tamping apparatus comprising a vehicle, a boom carried thereby, a carriage on the boom, a guide structure on the carriage, a vertically movable frame on the structure, means for moving the frame, tamping elements carried by the frame, and a motor on the frame for actuating the elements.

8. A concrete tamping apparatus comprising a vehicle, a boom carried thereby, a carriage on the boom, a guide structure on the carriage, a vertically movable frame on the structure, means for moving the frame, tamping elements carried by the frame, a motor on the frame for actuating the elements, and a source of power on the vehicle for supplying the motor.

ADELBERT FRANKLIN PARKER.